(12) United States Patent
Yamashita et al.

(10) Patent No.: US 10,704,441 B2
(45) Date of Patent: Jul. 7, 2020

(54) EXHAUST GAS-PURIFYING CATALYST

(71) Applicant: CATALER CORPORATION, Kakegawa-shi, Shizuoka (JP)

(72) Inventors: Yoshinori Yamashita, Kakegawa (JP); Shohei Tomita, Kakegawa (JP); Daisuke Ochiai, Kakegawa (JP); Masatoshi Ikebe, Kakegawa (JP)

(73) Assignee: Cataler Corporation, Kakegawa-shi (JP)

( * ) Notice: Subject to any disclaimer, the term of this patent is extended or adjusted under 35 U.S.C. 154(b) by 0 days.

(21) Appl. No.: 16/662,894

(22) Filed: Oct. 24, 2019

(65) Prior Publication Data

US 2020/0056523 A1 Feb. 20, 2020

Related U.S. Application Data

(63) Continuation of application No. PCT/JP2017/045371, filed on Dec. 18, 2017.

(30) Foreign Application Priority Data

Apr. 28, 2017 (JP) ................................. 2017-089404

(51) Int. Cl.
*B01J 23/56* (2006.01)
*F01N 3/10* (2006.01)

(52) U.S. Cl.
CPC .............. *F01N 3/103* (2013.01); *B01J 23/56* (2013.01); *F01N 3/101* (2013.01); *F01N 2510/0684* (2013.01)

(58) Field of Classification Search
CPC .. B01J 23/56; F01N 3/101; F01N 2510/0684; F01N 3/103
(Continued)

(56) References Cited

U.S. PATENT DOCUMENTS 4,957,896 A * 9/1990 Matsumoto .......... B01D 53/945
423/213.5
7,205,257 B2 * 4/2007 Tanaka ................. B01D 53/945
502/302

(Continued)

FOREIGN PATENT DOCUMENTS

JP 2001-252563 A 9/2001
JP 2002-364338 A 12/2002
(Continued)

OTHER PUBLICATIONS

International Search Report dated Mar. 20, 2018 in connection with PCT International Application No. PCT/JP2017/045371.
(Continued)

*Primary Examiner* — Tom P Duong
(74) *Attorney, Agent, or Firm* — John P. White; Cooper & Dunham LLP

(57) ABSTRACT

An exhaust gas-purifying catalyst of the present invention comprising a substrate, a first catalyst layer comprising a first supported catalyst, a second supported catalyst, palladium, and a first nitrogen oxide storage material, and a second catalyst layer comprising a third supported catalyst having an alloying rate of platinum and palladium of 40% or more and a second nitrogen oxide storage material, wherein a mass of the second supported catalyst is greater than a mass of the first supported catalyst and greater than a mass of the third supported catalyst.

9 Claims, 5 Drawing Sheets

(58) Field of Classification Search
USPC .......................................................... 502/230
See application file for complete search history.

(56) References Cited

U.S. PATENT DOCUMENTS

| | | | | |
|---|---|---|---|---|
| 8,546,296 | B2* | 10/2013 | Yabuzaki | B01D 53/945 |
| | | | | 423/213.5 |
| 8,580,706 | B2* | 11/2013 | Matsueda | B01D 53/945 |
| | | | | 502/327 |
| 2009/0023580 | A1* | 1/2009 | Tanaka | B01D 53/945 |
| | | | | 502/171 |
| 2010/0004122 | A1* | 1/2010 | Hori | B01J 23/002 |
| | | | | 502/303 |
| 2015/0266014 | A1* | 9/2015 | Xue | B01J 35/0006 |
| | | | | 423/213.5 |
| 2015/0306571 | A1 | 10/2015 | Jung | |
| 2017/0122176 | A1* | 5/2017 | Nomura | B01D 53/944 |
| 2018/0106174 | A1* | 4/2018 | Suzuki | B01J 23/63 |

FOREIGN PATENT DOCUMENTS

| | | |
|---|---|---|
| JP | 2003-210988 A | 7/2003 |
| JP | 2003-245523 A | 9/2003 |
| JP | 2008-100230 A | 5/2008 |
| JP | 2009-293445 A | 12/2009 |
| JP | 2010-017694 A | 1/2010 |
| JP | 2010-234309 A | 10/2010 |
| JP | 2012-035253 A | 2/2012 |
| JP | 2013-063438 A | 4/2013 |
| JP | 2017-070899 A | 4/2017 |
| WO | WO 02/068118 A1 | 9/2002 |
| WO | WO 2005/092481 A1 | 10/2005 |

OTHER PUBLICATIONS

Written Opinion (form PCT/ISA/237) dated Mar. 20, 2018 in connection with PCT International Application No. PCT/JP2017/045371.
English translation of the International Preliminary Report on Patentability dated Nov. 7, 2019 in connection with PCT International Application No. PCT/JP2017/045371.

* cited by examiner

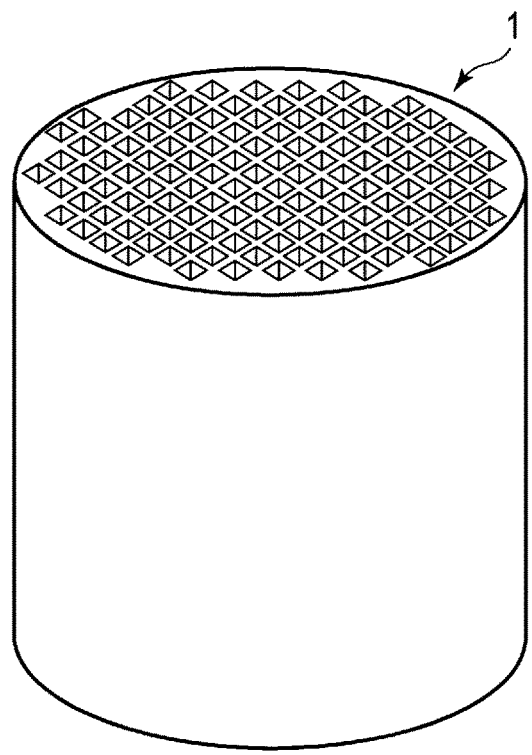
F I G. 1
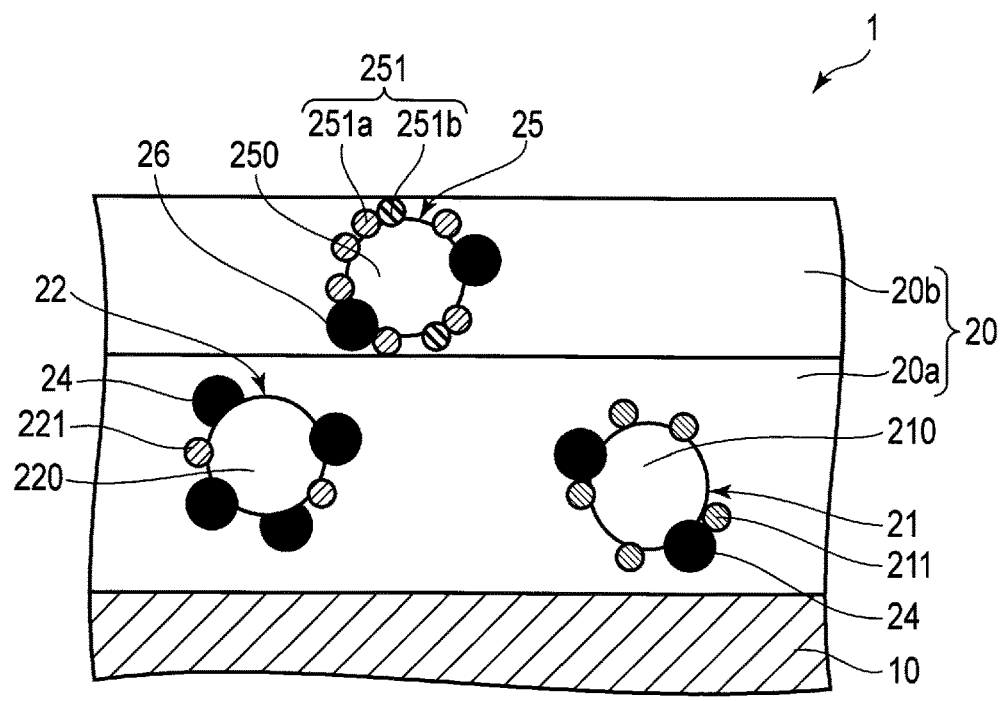
F I G. 2

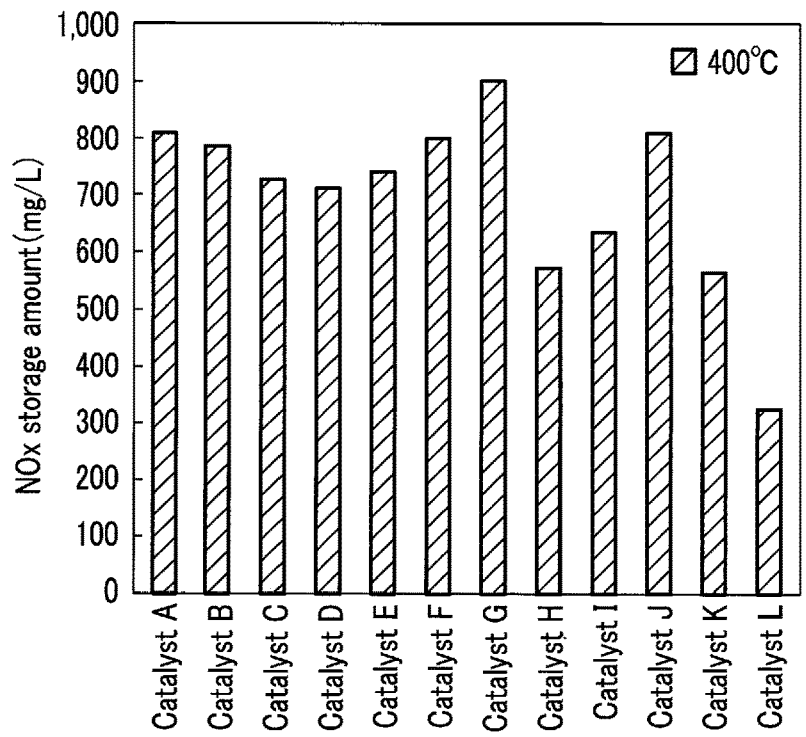
F I G. 7
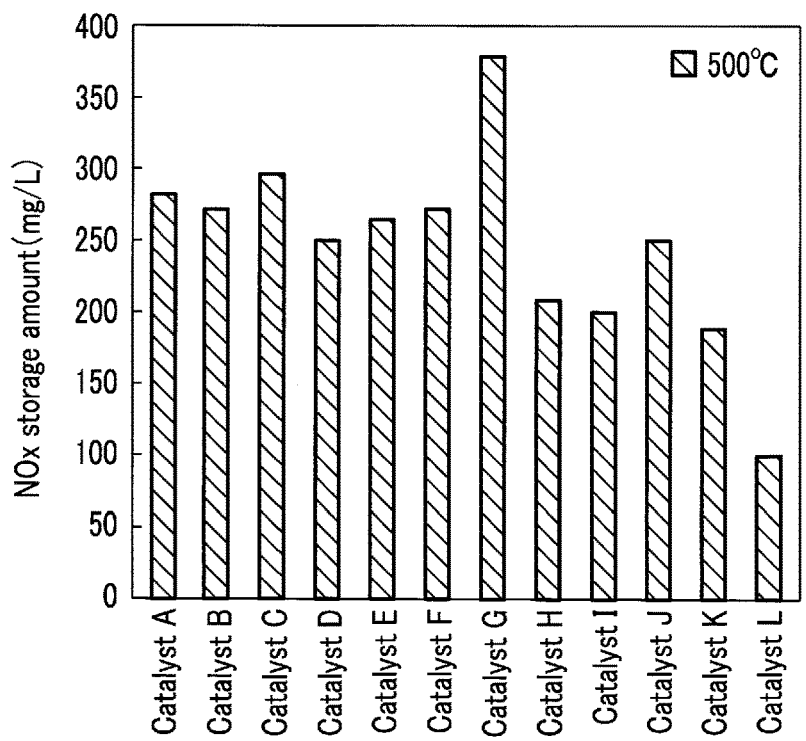
F I G. 8

EXHAUST GAS-PURIFYING CATALYST

CROSS-REFERENCE TO RELATED APPLICATIONS

This application is a Continuation Application of PCT Application No. PCT/JP2017/045371, filed Dec. 18, 2017, and based upon and claiming the benefit of priority from Japanese Patent Application No. 2017-089404, filed Apr. 28, 2017, the entire contents of all of which are incorporated herein by reference.

FIELD

The present invention relates to an exhaust gas-purifying catalyst.

BACKGROUND

In recent years, the regulation on exhaust gas of motor vehicles has been tightened around the world. In order to cope with this, various exhaust gas-purifying catalysts for purifying hydrocarbons (HC), carbon monoxide (CO), nitrogen oxides ($NO_x$) and the like in exhaust gas have been developed. In particular, the European vehicle emission standards EURO6 has strict regulations on $NO_x$ emissions. For this reason, an exhaust gas-purifying catalyst exhibiting excellent $NO_x$ purification performance is demanded.

In addition, a decrease in fuel consumption of motor vehicles has been increasingly demanded in recent years. In order to meet this demand, a lean-burn engine has attracted attention as an internal combustion engine mounted on a motor vehicle. Moreover, a $NO_x$ storage and reduction catalyst (NSR catalyst) has been proposed as an exhaust gas-purifying catalyst for a motor vehicle equipped with the lean-burn engine (Jpn. Pat. Appln. KOKAI Publication No. 2013-063438, Jpn. Pat. Appln. KOKAI Publication No. 2012-035253, Jpn. Pat. Appln. KOKAI Publication No. 2008-100230, Jpn. Pat. Appln. KOKAI Publication No. 2003-245523, Jpn. Pat. Appln. KOKAI Publication No. 2003-210988, Jpn. Pat. Appln. KOKAI Publication No. 2002-364338, Jpn. Pat. Appln. KOKAI Publication No. 2001-252563, and Jpn. PCT National Publication No. 2007-530271).

The NSR catalyst contains a noble metal which promotes the reduction reaction of $NO_x$ and a $NO_x$ storage material which can store and release $NO_x$. As the $NO_x$ storage materials, for example, an alkali metal element such as potassium (K), an alkaline earth metal element such as barium (Ba), a rare earth metal element such as cerium (Ce) or zirconium (Zr), or two or more of these are used.

$NO_x$ storage materials containing an alkali metal element and an alkaline earth metal element have a large $NO_x$ storage amount per unit mass. However, it is difficult to uniformly disperse the $NO_x$ storage material containing the alkali metal element and the alkaline earth metal element in the exhaust gas-purifying catalyst. For this reason, the $NO_x$ storage amount per unit mass tends to decrease when the amount of $NO_x$ storage material used is excessively increased. In addition, $NO_x$ storage materials containing a rare earth metal element have a lower ability to adsorb $NO_x$ in the exhaust gas as compared with the $NO_x$ storage materials containing the alkali metal element and the alkaline earth metal element, and it is difficult to achieve a sufficient $NO_x$ storage amount.

Furthermore, the temperature of exhaust gas emitted from the lean-burn engine is relatively low. Hence, the NSR catalyst is required to realize excellent $NO_x$ storage ability in a relatively low temperature region.

SUMMARY

An object of the present invention is to provide a technology capable of achieving excellent $NO_x$ storage ability.

According to a first aspect of the present invention, there is provided an exhaust gas-purifying catalyst including a substrate and a catalyst layer supported on the substrate, wherein the catalyst layer contains: a first supported catalyst containing a first heat resistant carrier and rhodium supported on the first heat resistant carrier; a second supported catalyst containing a second heat resistant carrier and platinum supported on the second heat resistant carrier, the second heat resistant carrier containing an inorganic oxide which has a spinel structure and contains alumina and magnesia; a third supported catalyst containing a third heat resistant carrier and platinum and a noble metal other than platinum which are supported on the third heat resistant carrier; and a nitrogen oxide storage material, wherein a proportion of a mass of platinum contained in the second supported catalyst in an entire mass of platinum contained in the catalyst layer is in a range of 15% by mass to 35% by mass.

BRIEF DESCRIPTION OF THE DRAWING(S)

FIG. 1 is a perspective view schematically illustrating an exhaust gas-purifying catalyst according to an aspect of the present invention;

FIG. 2 is a cross-sectional view schematically illustrating an example of a structure which can be employed in the exhaust gas-purifying catalyst illustrated in FIG. 1;

FIG. 7 is a graph illustrating the results of the nitrogen oxide storage amount evaluation test at a temperature of 400° C.;

FIG. 8 is a graph illustrating the results of the nitrogen oxide storage amount evaluation test at a temperature of 500° C.;

DETAILED DESCRIPTION

Figure 3:
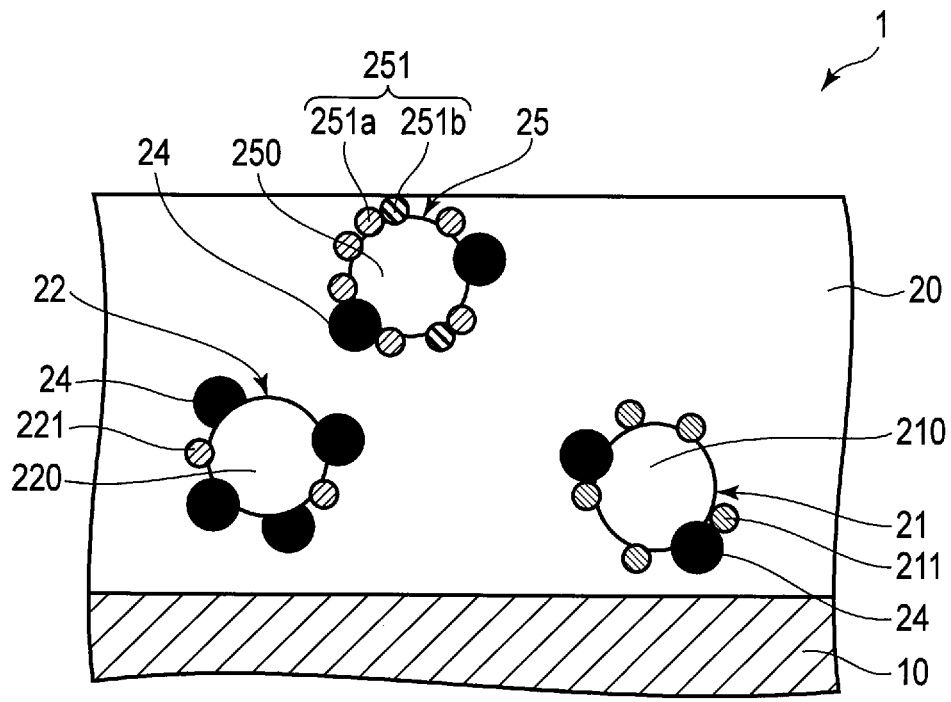
FIG. 3 is a cross-sectional view schematically illustrating a modification of the exhaust gas-purifying catalyst illustrated in FIGS. 1 and 2.

Hereinafter, aspects of the present invention will be described.

[Exhaust Gas-Purifying Catalyst]

FIG. 1 is a perspective view schematically illustrating an exhaust gas-purifying catalyst according to an aspect of the present invention. FIG. 2 is a cross-sectional view schematically illustrating an example of a structure which can be employed in the exhaust gas-purifying catalyst illustrated in FIG. 1.

An exhaust gas-purifying catalyst 1 illustrated in FIGS. 1 and 2 is a monolith catalyst. This exhaust gas-purifying catalyst 1 is typically an exhaust gas-purifying catalyst for a lean-burn engine. As illustrated in FIG. 2, this exhaust gas-purifying catalyst 1 includes a substrate 10 such as a monolith honeycomb substrate. The substrate 10 is typically formed of ceramics such as cordierite.

A catalyst layer 20 is formed on the partition walls of the substrate 10. The catalyst layer 20 includes a first catalyst layer 20a supported on the substrate 10 and a second catalyst layer 20b provided on the first catalyst layer 20a.

[First Catalyst Layer]

The first catalyst layer 20a contains a first supported catalyst 21, a second supported catalyst 22, and a first nitrogen oxide ($NO_x$) storage material 24. The first catalyst layer 20a mainly plays a role of storing $NO_x$ in an oxidizing atmosphere and reducing $NO_x$ in a reducing atmosphere.

[First Supported Catalyst]

The first supported catalyst 21 contains a first heat resistant carrier 210 and a first noble metal 211. The first supported catalyst 21 mainly plays a role of reducing $NO_x$.

The proportion of the first supported catalyst 21 in the first catalyst layer 20a is, for example, preferably in a range of 10% by mass to 20% by mass and more preferably in a range of 12.5% by mass to 17.5% by mass.

The amount of the first supported catalyst 21 per unit volume of the exhaust gas-purifying catalyst 1 is, for example, in a range of 15 g/L to 40 g/L and preferably in a range of 25 g/L to 30 g/L.

The $NO_x$ storage amount in the exhaust gas-purifying catalyst 1 tends to decrease when the amount of the first supported catalyst 21 contained in the exhaust gas-purifying catalyst 1 is excessively increased. In addition, the $NO_x$ purification performance of the exhaust gas-purifying catalyst 1 tends to decrease when the amount of the first supported catalyst 21 contained in the exhaust gas-purifying catalyst 1 is excessively decreased.

[First Heat Resistant Carrier]

The first heat resistant carrier 210 is typically formed of an inorganic oxide including zirconia ($ZrO_2$), ceria ($CeO_2$), alumina ($Al_2O_3$), or a composite oxide of these. The first heat resistant carrier 210 is preferably a composite oxide of $Al_2O_3$ and $CeO_2$ and $ZrO_2$ and more preferably $ZrO_2$.

In the composite oxide of $Al_2O_3$ and $CeO_2$ and $ZrO_2$, the proportion of $Al_2O_3$ is preferably in a range of 30% by mass to 75% by mass. The $NO_x$ storage ability of the exhaust gas-purifying catalyst 1 tends to increase when the proportion of $Al_2O_3$ in the first heat resistant carrier 210 is in this range.

The proportion of $CeO_2$ in the composite oxide of $Al_2O_3$ and $CeO_2$ and $ZrO_2$ is preferably in a range of 10% by mass to 40% by mass and more preferably in a range of 15% by mass to 25% by mass. The $NO_x$ storage ability of the exhaust gas-purifying catalyst 1 tends to increase when the proportion of $CeO_2$ in the first heat resistant carrier 210 is in this range.

The proportion of $ZrO_2$ in the composite oxide of $Al_2O_3$ and $CeO_2$ and $ZrO_2$ is preferably in a range of 20% by mass to 50% by mass and more preferably in a range of 20% by mass to 40% by mass. The $NO_x$ storage ability of the exhaust gas-purifying catalyst 1 tends to increase when the proportion of $ZrO_2$ in the first heat resistant carrier 210 is in this range.

The first heat resistant carrier 210 is typically crystalline. The crystal structure of the first heat resistant carrier 210 can be confirmed by X-ray diffraction (XRD). The crystal structure of the first heat resistant carrier 210 is, for example, a spinel type or a monoclinic type.

An average particle diameter of the first heat resistant carrier 210 is, for example, in a range of 5 μm to 30 μm and typically in a range of 5 μm to 15 μm. Incidentally, this "average particle diameter" means the value attained by the following method.

First, a part of the first catalyst layer 20a is removed from the exhaust gas-purifying catalyst 1. Next, a SEM image of this sample is taken at a magnification in a range of 1000-fold to 50000-fold using a scanning electron microscope (SEM). Subsequently, particles which are observed as a whole are selected from the first heat resistant carriers 210 taken in this SEM image, and the areas of the respective particles selected are determined. The diameters of circles having areas equal to these areas are respectively calculated, and the arithmetic mean of these diameters is attained. This arithmetic mean is adopted as the average particle diameter.

The BET specific surface area of the first heat resistant carrier 210 is preferably 80 $m^2$/g or more and more preferably 100 $m^2$/g or more. This specific surface area does not particularly have an upper limit value, but according to an example, the upper limit value is 130 $m^2$/g or less. When the specific surface area of the first heat resistant carrier 210 is large, the dispersibility of the first noble metal 211 supported on the first heat resistant carrier 210 and the first $NO_x$ storage material 24 tends to be high.

Incidentally, this "specific surface area" means a specific surface area determined by a nitrogen BET (Brunauer, Emmet and Teller) method, namely, a BET specific surface area. The specific surface area based on this nitrogen BET method can be determined by the following method.

First, the nitrogen gas adsorption amount (mL/mL) to the first heat resistant carrier 210 for each pressure P is measured while gradually raising the pressure P (mmHg) of nitrogen gas in nitrogen gas at 77 K (boiling point of nitrogen). Subsequently, the value attained by dividing the pressure P (mmHg) by the saturated vapor pressure $P_0$ (mmHg) of nitrogen gas is taken as the relative pressure $P/P_0$, and the nitrogen gas adsorption amount is plotted with respect to the respective relative pressures $P/P_0$ to attain an adsorption isotherm. Subsequently, a BET plot is calculated from this nitrogen adsorption isotherm and the BET equation, and this BET plot is utilized to attain a specific surface area. Incidentally, a BET multipoint method is used to calculate the BET plot.

[First Noble Metal]

The first noble metal 211 is selectively supported on the surface of the first heat resistant carrier 210. Here, to be "selectively supported" means that approximately all of the first noble metals 211 are supported on the first heat resistant carrier 210. However, this does not exclude the presence of the first noble metal 211 which is inevitably detached from the first heat resistant carrier 210.

The first noble metal 211 contains rhodium (Rh). The first noble metal 211 may contain a noble metal other than Rh but preferably contains only Rh. Rh and a noble metal other than Rh are less likely to form an alloy on the first heat resistant carrier 210 when the first heat resistant carrier 210 selectively supports only Rh. The catalytic performance of Rh and a noble metal other than Rh tends to decrease when Rh is alloyed with the noble metal other than Rh. For this reason, the purification performance of the first supported catalyst 21 is less likely to decrease when the first noble metal 211 contains only Rh.

The first noble metal 211 promotes the oxidation reaction of CO and HC and the reduction reaction of $NO_x$. Rh contained in the first noble metal 211 is excellent in promoting the $NO_x$ reduction reaction as compared with other noble metals such as Pt and Pd. Reaction Formula (1) is represented below in which $NO_x$ reacts with a reducing agent R and nitrogen ($N_2$) and a reducing agent oxide ($RO_x$) are generated.

$$NO_x + R \rightarrow 1/2 N_2 + RO_x \qquad (1)$$

The first noble metal 211 is typically in the form of particles. The average particle diameter of the first noble metal 211 is smaller than the average particle diameter of the first heat resistant carrier 210. The average particle diameter of the first noble metal 211 is, for example, 40 nm or less and typically 20 nm or less. The lower limit value of this average particle diameter is not particularly limited, but according to an example, the lower limit value is 0.1 nm or more. When the average particle diameter of the first noble metal 211 is set to be small, the contact efficiency between the first noble metal 211 and the exhaust gas tends to increase and the purification performance tends to be enhanced. Incidentally, this "average particle diameter" means the value attained by a CO pulse adsorption method. As a CO pulse adsorption apparatus, a gas adsorption amount measuring apparatus manufactured by HEMMI Slide Rule Co., Ltd. and the like can be used.

The proportion of the first noble metal 211 in the first supported catalyst 21 is preferably in a range of 0.01% by mass to 5.0% by mass and more preferably in a range of 0.01% by mass to 1.5% by mass. The $NO_x$ purification performance of the first supported catalyst 21 tends to decrease when the proportion of the first noble metal 211 in the first supported catalyst 21 is excessively increased or excessively decreased.

The amount of the first noble metal 211 per unit volume of the exhaust gas-purifying catalyst 1 is preferably in a range of 0.05 g/L to 1.0 g/L and more preferably in a range of 0.25 g/L to 0.7 g/L.

[Second Supported Catalyst]

The second supported catalyst 22 contains a second heat resistant carrier 220 and a second noble metal 221. The second supported catalyst 22 mainly functions as a $NO_x$ storage material together with the first $NO_x$ storage material 24 supported on the second heat resistant carrier 220.

It is preferable that the proportion of the second supported catalyst 22 in all the supported catalysts contained in the exhaust gas-purifying catalyst 1 is the highest. In other words, it is preferable that the mass of the second supported catalyst 22 contained in the exhaust gas-purifying catalyst 1 is greater than the mass of the first supported catalyst 21 and greater than the mass of the third supported catalyst 25. In addition, it is more preferable that the mass of the second supported catalyst 22 contained in the exhaust gas-purifying catalyst 1 is greater than the total amount of the mass of the first supported catalyst 21 and the mass of the third supported catalyst 25.

The amount of the second supported catalyst 22 per unit volume of the exhaust gas-purifying catalyst 1 is, for example, 70 g/L or more, preferably 100 g/L or more, and more preferably 135 g/L or more. The upper limit value of the amount of the second supported catalyst 22 per unit volume of the exhaust gas-purifying catalyst 1 is not particularly limited, but according to an example, the upper limit value is 150 g/L. When the amount of the second supported catalyst 22 is increased, the proportion of the first $NO_x$ storage material 24 supported on the second supported catalyst 22 increases and the $NO_x$ storage amount in the exhaust gas-purifying catalyst 1 can be increased.

The ratio M1/M2 of the mass M1 of the second supported catalyst 22 to the mass M2 of the first supported catalyst 21 is, for example, preferably in a range of 4.0 to 5.5 and more preferably in a range of 4.5 to 5.25.

In addition, the ratio M1/M3 of the mass M1 of the second supported catalyst 22 to the mass M3 of the third supported catalyst 25 is preferably in a range of 1.0 to 2.5 and more preferably in a range of 1.8 to 2.4.

The proportion of the second supported catalyst 22 in the first catalyst layer 20a is preferably in a range of 70% by mass to 85% by mass and more preferably in a range of 73% by mass to 82% by mass.

[Second Heat Resistant Carrier]

The second heat resistant carrier 220 has a spinel structure and contains inorganic oxides including alumina ($Al_2O_3$) and magnesia ($MgO_2$), namely, a spinel-type Al—Mg-based composite oxide. The crystal structure of the second heat resistant carrier 220 can be confirmed by X-ray diffraction (XRD). The spinel-type Al—Mg-based composite oxide exhibits excellent $NO_x$ storage ability.

It is preferable that the spinel-type Al—Mg-based composite oxide further contains $CeO_2$, iron oxide ($Fe_2O_3$), barium carbonate ($BaCO_3$), or a composite oxide of these. The $NO_x$ storage ability of the exhaust gas-purifying catalyst 1 at low temperatures tends to be enhanced when the spinel-type Al—Mg-based composite oxide further contains these oxides.

The proportion of $Al_2O_3$ in this spinel-type Al—Mg-based composite oxide is preferably in a range of 40% by mass to 70% by mass and more preferably in a range of 50% by mass to 65% by mass. The heat resistance of the second supported catalyst 22 tends to increase when the proportion of $Al_2O_3$ in the spinel-type Al—Mg-based composite oxide is increased.

In addition, the proportion of $MgO_2$ in the spinel-type Al—Mg-based composite oxide is preferably in a range of 10% by mass to 30% by mass and more preferably in a range of 15% by mass to 25% by mass.

The proportion of $CeO_2$ in this spinel-type Al—Mg-based composite oxide is preferably in a range of 1% by mass to 10% by mass and more preferably in a range of 4.5% by mass to 6.0% by mass. The $NO_x$ storage ability of the second heat resistant carrier 220 tends to be enhanced when the spinel-type Al—Mg-based composite oxide further contains $CeO_2$.

In addition, the proportion of $Fe_2O_3$ in the spinel-type Al—Mg-based composite oxide is preferably in a range of 0% by mass to 5% by mass and more preferably in a range of 0% by mass to 3% by mass.

In addition, the proportion of $BaCO_3$ in the spinel-type Al—Mg-based composite oxide is preferably in a range of 0% by mass to 10% by mass and more preferably in a range of 0% by mass to 5% by mass.

The $NO_x$ storage ability of the second heat resistant carrier 220 is higher than that of the first and third heat resistant carriers. The $NO_x$ storage ability of each heat resistant carrier can be determined by the following method. First, each heat resistant carrier material is molded into a 1 to 2 mm pellet to prepare a sample. Subsequently, 0.5 g of the sample is set in the simulated gas reactor. Subsequently, this sample is heated to 500° C., then $N_2$ gas mixed with CO is supplied thereto for 5 minutes, and the pretreatment is performed. Subsequently, the gas to be supplied is switched to $N_2$ gas and the temperature of the sample is lowered to 200° C. Subsequently, the gas to be supplied is switched to $N_2$ gas containing $NO_2$ and $O_2$, the $N_2$ gas containing $NO_2$ and $O_2$ is supplied to the sample for a certain time, and the mass of $NO_x$ contained in the gas on the downstream side of the sample is measured. Subsequently, the difference between the mass of $NO_x$ contained in the gas on the downstream side of the sample and the mass of $NO_x$ contained in the supplied gas for each period in this certain time is integrated, and the $NO_x$ storage amount in the sample is determined.

The average particle diameter of the second heat resistant carrier 220 is, for example, in a range of 3 μm to 30 μm and typically in a range of 3 μm to 15 μm. This average particle diameter can be determined by the same method as the method of measuring the average particle diameter of the first heat resistant carrier 210 described above.

It is preferable that the BET specific surface area of the second heat resistant carrier 220 is larger than the BET specific surface area of the first heat resistant carrier 210 and larger than the BET specific surface area of the third heat resistant carrier 250. The BET specific surface area of the second heat resistant carrier 220 is, for example, 50 $m^2/g$ or more, preferably 80 $m^2/g$ or more, more preferably 100 $m^2/g$ or more, and still more preferably 130 $m^2/g$ or more. When the BET specific surface area of the second heat resistant carrier 220 is large, the dispersibility of the second noble metal 221 supported on the second heat resistant carrier 220 and the first $NO_x$ storage material 24 is enhanced and the $NO_x$ storage ability of the second supported catalyst 22 tends to be enhanced in an oxidizing atmosphere.

The upper limit value of this BET specific surface area is not particularly limited, but is 180 $m^2/g$ or less according to an example, and is typically 155 $m^2/g$ or less. The BET specific surface area can be determined by the same method as the method of measuring the BET specific surface area of the first heat resistant carrier 210 described above.

[Second Noble Metal]

The second noble metal 221 is selectively supported on the surface of the second heat resistant carrier 220. The second noble metal 221 promotes the oxidation reaction of CO and HC and the reduction reaction of $NO_x$.

The second noble metal 221 contains Pt. The second noble metal 221 may contain a noble metal other than Pt but preferably contains only Pt. The $NO_x$ storage ability of the second supported catalyst 22 tends to be enhanced when the second heat resistant carrier 220 selectively supports only Pt.

Pt is excellent in promoting a reaction to oxidize nitric oxide (NO) and to generate $NO_2$ in an oxidizing atmosphere as compared with other noble metals such as Pd and Rh. $NO_2$ is more likely to be stored in the $NO_x$ storage material than NO. For this reason, the second heat resistant carrier 220 supporting Pt can further enhance the $NO_x$ storage ability as compared with a carrier which does not support Pt.

The second noble metal 221 is typically in the form of particles. The average particle diameter of the second noble metal 221 is smaller than the average particle diameter of the second heat resistant carrier 220. The average particle diameter of the second noble metal 221 is 30 nm or less and more preferably 10 nm or less. The lower limit value of this average particle diameter is not particularly limited, but according to an example, the lower limit value is 0.1 nm or more. When the average particle diameter of the second noble metal 221 is set to be small, the contact efficiency between the second noble metal 221 and the exhaust gas tends to increase and the purification performance tends to be enhanced. This average particle diameter can be determined by the same measurement method as the method of measuring the average particle diameter of the first noble metal 211 described above.

The proportion of the mass $Pt_2$ of platinum contained in the second supported catalyst 22 in the entire mass $Pt_A$ of platinum contained in the exhaust gas-purifying catalyst 1, namely, the Pt ratio ($Pt_2/Pt_A$) is in a range of 15% by mass to 35% by mass. The $NO_x$ storage rate of the exhaust gas-purifying catalyst 1 can be increased when the Pt ratio ($Pt_2/Pt_A$) is in this range since the balance between the amount of $NO_2$ generated mainly by the action of the third supported catalyst 25 to be described later and the amount of $NO_2$ stored mainly by the action of the second supported catalyst 22 is adjusted. In other words, in a case in which the Pt ratio ($Pt_2/Pt_A$) is excessively high, the $NO_x$ storage ability of the second supported catalyst 22 is enhanced, but the $NO_x$ generation ability of the third supported catalyst 25 decreases, and thus the $NO_x$ storage amount in the exhaust gas-purifying catalyst 1 tends to decrease. In addition, in a case in which the Pt ratio ($Pt_2/Pt_A$) is excessively low, the $NO_x$ generation ability of the third supported catalyst 25 is enhanced, but the $NO_x$ storage ability of the second supported catalyst 22 decreases, and thus the $NO_x$ storage amount in the exhaust gas-purifying catalyst 1 tends to decrease. The Pt ratio ($Pt_2/Pt_A$) is more preferably in a range of 20% by mass to 35% by mass.

The proportion of the second noble metal 221 in the second supported catalyst 22 is preferably in a range of 0.1% by mass to 1.0% by mass and more preferably in a range of 0.2% by mass to 0.5% by mass. The $NO_x$ storage ability of the second supported catalyst 22 tends to decrease when the proportion of the second noble metal 221 in the second supported catalyst 22 is excessively increased or excessively decreased.

The amount of the second noble metal 221 per unit volume of the exhaust gas-purifying catalyst 1 is, for example, in a range of 0.1 g/L to 1.0 g/L and preferably in a range of 0.2 g/L to 0.5 g/L.

[First $NO_x$ Storage Material]

The first $NO_x$ storage material 24 typically contains a carbonate or oxide containing at least one element selected from the group consisting of barium (Ba), potassium (K), lithium (Li), and cerium (Ce).

The crystal structure of an oxide containing Ce is preferably amorphous. In addition, the BET specific surface area of the oxide containing Ce is preferably 120 $m^2/g$ or more. This specific surface area does not particularly have an upper limit value, but according to an example, the upper limit value is 200 $m^2/g$ or less. The BET specific surface area can be determined by the same method as the method of measuring the BET specific surface area of the first heat resistant carrier 210 described above. In addition, the proportion of $CeO_2$ in the oxide containing Ce is typically 70% by mass or more.

The first $NO_x$ storage material 24 is typically supported on the first and second supported catalysts. The first $NO_x$ storage material 24 is typically in the form of particles. The average particle diameter of the first $NO_x$ storage material 24 is smaller than those of the first and second heat resistant carriers. The average particle diameter of the first $NO_x$ storage material 24 is preferably 5 nm or less and more preferably 1 nm or less. The lower limit value of the average particle diameter of the first $NO_x$ storage material 24 is not particularly limited, but according to an example, the lower limit value is 0.1 nm or more. When the average particle diameter of the first $NO_x$ storage material 24 is set to be small, the contact efficiency between the first $NO_x$ storage material 24 and the exhaust gas tends to increase and the $NO_x$ storage amount in the exhaust gas-purifying catalyst 1 tends to increase. The average particle diameter of the first $NO_x$ storage material 24 can be determined by the same method as the method of measuring the average particle diameter of the first heat resistant carrier 210 described above.

The first $NO_x$ storage material 24 stores $NO_x$ in an oxidizing atmosphere and releases $NO_x$ in a reducing atmosphere. The $NO_x$ storage and release mechanism of the first $NO_x$ storage material 24 will be described below in detail.

First, the first $NO_x$ storage material 24 reacts with CO in the exhaust gas in an oxidizing atmosphere to generate a carbonate. Thereafter, the carbonate of the first $NO_x$ storage material 24 reacts with $NO_2$ in the exhaust gas to generate a nitrate. In other words, $NO_x$ in the exhaust gas is stored in the first $NO_x$ storage material 24 in the form of a nitrate.

As an example of the $NO_x$ storage mechanism of the first $NO_x$ storage material 24, Reaction Formula (2) in which barium carbonate ($BaCO_3$) generates barium nitrate ($Ba(NO_3)_2$) by $NO_2$ and $O_2$ and Reaction Formula (3) in which potassium carbonate ($K_2CO_3$) generates potassium nitrate ($KNO_3$) by $NO_2$ and $O_2$ are presented below.

$$BaCO_3 + 2NO_2 + 1/2 O_2 \rightarrow Ba(NO_3)_2 + CO_2 \quad (2)$$

$$K_2CO_3 + 2NO_2 + 1/2 O_2 \rightarrow 2KNO_3 + CO_2 \quad (3)$$

Next, the nitrate of the first $NO_x$ storage material 24 reacts with the reducing agent R in a reducing atmosphere and $NO_x$ is thus released. As an example of the $NO_x$ release mechanism of the first $NO_x$ storage material 24, Reaction formula (4) in which $Ba(NO_3)_2$ reacts with the reducing agent R and barium oxide (BaO) and a reducing agent oxide (RO) are thus generated and Reaction Formula (5) in which $KNO_3$ reacts with the reducing agent R and potassium oxide ($K_2O$) and RO are thus generated are presented below.

$$Ba(NO_3)_2 + 2R \rightarrow 2NO_x + BaO + 2RO_{2.5-x} \quad (4)$$

$$KNO_3 + R \rightarrow NO_x + 1/2 K_2O + RO_{2.5-x} \quad (5)$$

The first $NO_x$ storage material 24 which has released $NO_x$ is reduced from a nitrate to an oxide. By this, the $NO_x$ storage ability of the first $NO_x$ storage material 24 is regenerated and the first $NO_x$ storage material 24 can store $NO_x$ again.

The proportion of the first $NO_x$ storage material 24 in the first catalyst layer 20a is preferably in a range of 10% by mass to 40% by mass and more preferably in a range of 15% by mass to 25% by mass. The $NO_x$ purification performance of the exhaust gas-purifying catalyst 1 tends to decrease when the proportion of the first $NO_x$ storage material 24 in the first catalyst layer 20a is excessively increased. The $NO_x$ purification performance of the exhaust gas-purifying catalyst 1 tends to decrease when the proportion of the first $NO_x$ storage material 24 in the first catalyst layer 20a is excessively decreased.

The amount of the first $NO_x$ storage material 24 per unit volume of the exhaust gas-purifying catalyst 1 is preferably in a range of 30 g/L to 60 g/L and more preferably in a range of 40 g/L to 50 g/L.

[Second Catalyst Layer]

The second catalyst layer 20b contains a third supported catalyst 25 and a second $NO_x$ storage material 26. The second catalyst layer 20b mainly plays a role of oxidizing NO in an oxidizing atmosphere and thus generating $NO_2$.

[Third Supported Catalyst]

The third supported catalyst 25 contains a third heat resistant carrier 250 and a third noble metal 251. The third supported catalyst 25 mainly plays a role of oxidizing NO and thus generating $NO_2$.

The proportion of the third supported catalyst 25 in the second catalyst layer 20b is preferably in a range of 60% by mass to 90% by mass and more preferably in a range of 70% by mass to 80% by mass.

The amount of the third supported catalyst 25 per unit volume of the exhaust gas-purifying catalyst 1 is, for example, in a range of 50 g/L to 80 g/L and preferably in a range of 60 g/L to 70 g/L.

The $NO_x$ storage amount in the exhaust gas-purifying catalyst 1 tends to decrease when the amount of the third supported catalyst 25 contained in the exhaust gas-purifying catalyst 1 is excessively increased or excessively decreased.

[Third Heat Resistant Carrier]

The third heat resistant carrier 250 is, for example, a porous oxide containing aluminum (Al), silicon (Si), or titanium (Ti) as a main component. The third heat resistant carrier 250 is typically an inorganic oxide including $Al_2O_3$, $SiO_2$ (silica), $TiO_2$ (titania), $La_2O_3$ (lanthanum oxide), $Y_2O_3$ (yttrium oxide), or a composite oxide of these. The third heat resistant carrier 250 is preferably $Al_2O_3$ and may be an alumina-based composite oxide containing $Al_2O_3$ as a main component. The proportion of $Al_2O_3$ contained in the alumina-based composite oxide is preferably 70% by mass or more.

The third heat resistant carrier 250 is typically crystalline. The crystal structure of the third heat resistant carrier 250 can be confirmed by X-ray diffraction (XRD). The crystal structure of the third heat resistant carrier 250 is, for example, γ type (spinel type).

It is preferable that the $NO_x$ adsorption ability of the third heat resistant carrier 250 is lower than the $NO_x$ adsorption ability of the first heat resistant carrier 210. The $NO_x$ storage ability of the exhaust gas-purifying catalyst 1 tends to be enhanced when the $NO_x$ adsorption ability of the third heat resistant carrier 250 is lower than the $NO_x$ adsorption ability of the first heat resistant carrier 210.

The average particle diameter of the third heat resistant carrier 250 is, for example, in a range of 5 μm to 30 μm and typically in a range of 10 μm to 15 μm. This average particle diameter can be determined by the same method as the method of measuring the average particle diameter of the first heat resistant carrier 210 described above.

The BET specific surface area of the third heat resistant carrier 250 is preferably 80 m²/g or more and still more preferably 120 m²/g or more. When the BET specific surface area of the third heat resistant carrier 250 is large, the dispersibility of the third noble metal 251 supported on the third supported catalyst 25 and the second $NO_x$ storage material 26 is enhanced and the $NO_x$ storage ability tends to be enhanced. The upper limit value of this BET specific surface area is not particularly limited, but is 200 m²/g or less according to an example, and is typically 180 m²/g or less. The BET specific surface area can be determined by the same method as the method of measuring the BET specific surface area of the first heat resistant carrier 210 described above.

[Third Noble Metal]

The third noble metal 251 is selectively supported on the surface of the third heat resistant carrier 250. The third noble metal 251 promotes the oxidation reaction of CO and HC and the reduction reaction of $NO_x$.

The third noble metal 251 is typically in the form of particles. The third noble metal 251 contains Pt particles 251a and noble metal particles 251b other than Pt. The Pt particles 251a mainly play a role of promoting the oxidation reaction of NO in an oxidizing atmosphere and thus generating $NO_2$. In addition, the Pt particles 251a also play a role of lowering the concentration of the reducing agent in the exhaust gas in an oxidizing atmosphere. In other words, when a large amount of reducing agent such as HC or CO is contained in the exhaust gas, $NO_2$ is reduced to NO and the amount of $NO_2$ generated tends to decrease. Pt is excellent in promoting the oxidation reaction in an oxidizing atmosphere and thus can oxidize HC and CO and lower the concentration of the reducing agent in the exhaust gas.

The noble metal particles 231b other than Pt play a role of suppressing the sintering of Pt as well as promoting the oxidation reaction of CO, HC, and NO. It is preferable to use palladium as a noble metal other than Pt. When the third noble metal 251 contains Pt and Pd, Pt and Pd are less likely to be sintered and the dispersibility thereof tends to be high even after being used for a long period of time.

In addition, at least a part of Pt contained in the third noble metal 251 and at least a part of Pd contained in the third noble metal 251 may form an alloy. Pt and Pd tend to be more hardly sintered when being alloyed.

It is preferable that the average particle diameter of the Pt particles 251a contained in the third noble metal 251 is smaller than the average particle diameter of the second noble metal 221. The average particle diameter of the Pt particles 251a is preferably 20 nm or less and more preferably 13 nm or less. The lower limit value of the average particle diameter of the Pt particles 251a is not particularly limited, but according to an example, the lower limit value is 1 nm or more. When the average particle diameter of the Pt particles 251a is set to be small, the contact efficiency between the Pt particles 251a and the exhaust gas tends to increase and the $NO_x$ purification performance of the exhaust gas-purifying catalyst 1 tends to be enhanced.

The average particle diameter of the noble metal particles 251b other than Pt contained in the third noble metal 251 is preferably 15 nm or less and more preferably 10 nm or less. The lower limit value of the average particle diameter of the noble metal particles 251b other than Pt is not particularly limited, but according to an example, the lower limit value is 1 nm or more. The Pt particles 251a tend to be more hardly sintered when the average particle diameter of the noble metal particles 251b other than Pt is small.

This average particle diameter can be determined utilizing X-ray diffraction measurement or a CO pulse adsorption method. In other words, the third supported catalyst 25 is subjected to X-ray diffraction measurement, a peak of Pt or noble metal other than Pt is selected from the diffraction spectrum attained by this, and an average particle diameter is calculated utilizing the Scherrer equation. The average particle diameter is determined utilizing a CO pulse adsorption method in a case in which the particle diameter of the Pt particles 251a is equal to or less than the detection limit by X-ray diffraction measurement. In other words, the third supported catalyst 25 is subjected to the measurement by a CO pulse adsorption method, and the surface area of Pt is calculated from the CO adsorption amount attained by this. Assuming that the Pt particles are spherical particles having the same particle diameter, the diameter of particle is then determined from the calculated surface area of Pt, the mass of Pt, and the specific gravity of Pt. This diameter is adopted as the average particle diameter of Pt. The detection limit by X-ray diffraction measurement is 7 nm.

The ratio M8/M9 of the mass M8 of the third noble metal 251 to the mass M9 of the second noble metal 221 is preferably in a range of 2.5 to 6. When the ratio M8/M9 is in this range, $NO_2$ contained in the exhaust gas diffused from the second catalyst layer 20b to the first catalyst layer 20a is efficiently stored in the second supported catalyst 22 and thus the $NO_x$ purification performance of the exhaust gas-purifying catalyst 1 tends to be enhanced. The ratio M8/M9 is more preferably in a range of 3 to 4.

The mass $Pt_3$ of Pt contained in the third noble metal 251 is greater than the mass $Pt_2$ of Pt contained in the second noble metal 221. In other words, it is preferable that the proportion of the mass $Pt_3$ of Pt contained in the third supported catalyst 25 in the entire mass $Pt_4$ of Pt contained in the exhaust gas-purifying catalyst 1, namely, the Pt ratio ($Pt_3/Pt_4$) is in a range of 65% by mass to 85% by mass. Here, in this exhaust gas-purifying catalyst 1, it is preferable that only the third noble metal 251 and the second noble metal 221 contain Pt as described above. Hence, the entire mass $Pt_4$ of platinum contained in the exhaust gas-purifying catalyst typically means the sum of the mass $Pt_2$ of platinum contained in the second supported catalyst and the mass $Pt_3$ of platinum contained in the third supported catalyst.

The proportion of the third noble metal 251 in the third supported catalyst 25 is preferably in a range of 0.5% by mass to 5.0% by mass and more preferably in a range of 2.0% by mass to 3.0% by mass. The $NO_x$ purification performance of the third supported catalyst 25 tends to decrease when the proportion of the third noble metal 251 in the third supported catalyst 25 is excessively increased or excessively decreased.

The amount of the third noble metal 251 per unit volume of the exhaust gas-purifying catalyst 1 is, for example, in a range of 0.2 g/L to 5.0 g/L and preferably in a range of 1.0 g/L to 3.0 g/L.

[Second $NO_x$ Storage Material]

As the second $NO_x$ storage material 26, the same one as the first $NO_x$ storage material 24 described above can be used. The mass of the second $NO_x$ storage material 26 and the mass of the first $NO_x$ storage material 24 may be the same as or different from each other.

The proportion of the second $NO_x$ storage material 26 in the second catalyst layer 20b is preferably in a range of 10% by mass to 30% by mass and more preferably in a range of 15% by mass to 25% by mass. The $NO_x$ purification performance of the exhaust gas-purifying catalyst 1 tends to decrease when the proportion of the second $NO_x$ storage material 26 in the second catalyst layer 20b is excessively increased. The $NO_x$ purification performance of the exhaust gas-purifying catalyst 1 tends to decrease when the proportion of the second $NO_x$ storage material 26 in the second catalyst layer 20b is excessively decreased.

The amount of the second $NO_x$ storage material 26 per unit volume of the exhaust gas-purifying catalyst 1 is, for example, in a range of 5 g/L to 30 g/L and preferably in a range of 12 g/L to 24 g/L.

[Other Components]

The first and second catalyst layers may further contain a binder in addition to the components described above.

The binder strengthens bonding between the constituents contained in the first and second catalyst layers and improves the durability of the catalyst. As the binder, for example, alumina sol, titania sol, silica sol, or any mixture of these can be used.

The proportion of the binder in the first catalyst layer 20a is preferably in a range of 1.0% by mass to 5.0% by mass and more preferably in a range of 3.0% by mass to 4.0% by mass.

The proportion of the binder in the second catalyst layer 20b is preferably in a range of 1.0% by mass to 5.0% by mass and more preferably in a range of 3.0% by mass to 4.0% by mass.

The amount of the binder per unit volume of the exhaust gas-purifying catalyst 1 is, for example, in a range of 2.0 g/L to 10 g/L and preferably in a range of 5.0 g/L to 15.0 g/L.

[Method of Producing Exhaust Gas-Purifying Catalyst]

Next, an example of a method of producing this exhaust gas-purifying catalyst 1 will be described.

[Method of Preparing First Supported Catalyst]

First, the first supported catalyst 21 is prepared. Specifically, a solution containing the first noble metal 211 and a powder of the first heat resistant carrier 210 are first mixed together and thoroughly stirred. Subsequently, this mixture is dried to obtain a powder. Subsequently, the powder obtained is fired in the air at a temperature of 450° C. to 550° C. for 1 to 3 hours. The first supported catalyst 21 is thus obtained.

[Method of Preparing Second Supported Catalyst]

Next, the second supported catalyst 22 is prepared. Specifically, a solution containing the second noble metal 221 and a powder of the second heat resistant carrier 220 are first mixed together and thoroughly stirred. Subsequently, this mixture is dried to obtain a powder. Subsequently, the powder obtained is fired in the air at a temperature of 450° C. to 550° C. for 1 to 3 hours. The second supported catalyst 22 is thus obtained.

[Method of Preparing Third Supported Catalyst]

Next, the third supported catalyst 25 is prepared. Specifically, a Pt solution, a solution containing a noble metal other than Pt, and the third heat resistant carrier 250 are first mixed together and thoroughly stirred. Subsequently, this mixture is dried to obtain a powder. Subsequently, the powder obtained is fired in the air at a temperature of 450° C. to 550° C. for 1 to 3 hours. The third supported catalyst 25 is thus obtained.

[Formation of First and Second Catalyst Layers]

Next, the first supported catalyst 21, the second supported catalyst 22, a first $NO_x$ storage material 24 source, and water are mixed together and thoroughly stirred to obtain a first slurry.

As the first $NO_x$ storage material 24, an acetate, a nitrate, a sulfate, and a carbonate containing at least one element selected from the group consisting of Ba, K, Li, and Ce, or any mixture of these can be used.

Next, this first slurry is applied onto a honeycomb substrate 10 and heated at a temperature in a range of 90° C. to 250° C. for 5 minutes to 3 hours to dry the coated layer. Subsequently, the substrate 10 is fired at a temperature in a range of 450° C. to 550° C. for 1 to 3 hours. The first catalyst layer 20a is thus formed on the substrate 10.

Next, the third supported catalyst 25, a second $NO_x$ storage material 26 source, and water are mixed together and thoroughly stirred to obtain a second slurry. As the second $NO_x$ storage material 26 source, the same one as the first $NO_x$ storage material 24 source can be used.

Next, this second slurry is applied onto the honeycomb substrate 10 on which the first catalyst layer 20a is formed and heated at a temperature in a range of 90° C. to 250° C. for 5 minutes to 3 hours to dry the coated layer. Subsequently, the substrate 10 is fired at a temperature in a range of 450° C. to 550° C. for 1 to 3 hours. The second catalyst layer 20b is thus formed on the first catalyst layer 20a.

[$NO_x$ Purification Mechanism]

The exhaust gas-purifying catalyst 1 obtained as described above can achieve excellent $NO_x$ storage ability. Hence, this exhaust gas-purifying catalyst 1 can also achieve excellent $NO_x$ purification performance. It is considered that the reason is, for example, as described below. Here, it is described assuming that the combustion engine is a lean-burn engine.

Lean-burn engines are an engine in which an air-fuel mixture having an air-fuel ratio larger than the stoichiometric air-fuel ratio is supplied to the combustion chamber at the time of normal travel. For this reason, the exhaust gas from a lean-burn engine at the time of normal travel has relatively low concentrations of CO and HC and relatively high concentrations of $O_2$ and $NO_x$.

The catalyst layer 20 included in the exhaust gas-purifying catalyst 1 illustrated in FIGS. 1 and 2 has a two-layer structure including the first catalyst layer 20a and the second catalyst layer 20b. Hence, the exhaust gas emitted from the lean-burn engine at the time of normal travel first diffuses in the second catalyst layer 20b provided on the first catalyst layer 20a. At least a part of NO contained in the exhaust gas diffused in the second catalyst layer 20b is oxidized to $NO_2$ by the third noble metal 251 supported on the third supported catalyst 25. At least a part of $NO_2$ reacts with the second $NO_x$ storage material 26 supported on the third supported catalyst 25 to generate a nitrate.

In addition, at least parts of CO, HC, and $NO_x$ contained in the exhaust gas diffused in the second catalyst layer 20b are oxidized to $H_2O$ or $CO_2$ or reduced to $N_2$ by the third supported catalyst 25, and $H_2O$, $CO_2$, and $N_2$ are discharged from the second catalyst layer 20b into the air.

As described above, the third supported catalyst 25 contains Pt. Moreover, Pt is a catalyst excellent in promoting the oxidation reaction particularly in an oxidizing atmosphere. Hence, Pt promotes the oxidation of reducing agents such as HC and CO as well as promotes the oxidation of NO in the exhaust gas to $NO_2$ and thus makes it difficult to cause the reduction reaction of $NO_2$. For this reason, the third supported catalyst 25 can efficiently oxidize NO in the exhaust gas to $NO_2$.

Next, the exhaust gas having passed through the second catalyst layer 20b diffuses into the first catalyst layer 20a. The concentration of NO contained in the exhaust gas having passed through the second catalyst layer 20b tends to be lower than the concentration of NO contained in the exhaust gas before passing through the second catalyst layer 20b, and the concentration of $NO_2$ contained in the exhaust gas having passed through the second catalyst layer 20b tends to be higher than the concentration of $NO_2$ contained in the exhaust gas before passing through the second catalyst layer 20b.

At least a part of NO diffused into the first catalyst layer 20a is oxidized to $NO_2$ by the noble metals supported on the first and second supported catalysts contained in the first catalyst layer 20a. This $NO_2$ generated on the first and second supported catalysts reacts with the second $NO_x$ storage material 24 supported on the first and second supported catalysts, respectively, to generate a nitrate. In addition, at least a part of $NO_2$ diffused from the second catalyst layer 20b to the first catalyst layer 20a reacts with the second $NO_x$ storage material 24 supported on the first and second supported catalysts to generate a nitrate.

In addition, at least parts of CO and HC contained in the exhaust gas diffused into the first catalyst layer 20a are respectively oxidized to $CO_2$ and $H_2O$ by the noble metals supported on the first and second supported catalysts, at least a part of $NO_x$ contained in the exhaust gas diffused into the first catalyst layer 20a is reduced to $N_2$ by the noble metals supported on the first and second supported catalysts, and $CO_2$, $H_2O$, and $N_2$ are discharged from the first catalyst layer 20a into the air via the second catalyst layer 20b.

Here, the proportion of the mass $Pt_2$ of platinum contained in the second supported catalyst 22 in the entire mass $Pt_A$ of platinum contained in the exhaust gas-purifying catalyst 1, namely, the Pt ratio ($Pt_2/Pt_A$) is in a range of 15% by mass to 35% by mass. Platinum is typically contained only in the second and third supported catalysts. Hence, the entire mass $Pt_A$ of platinum contained in the exhaust gas-purifying catalyst means the sum of the mass $Pt_2$ of platinum contained in the second supported catalyst and the mass $Pt_3$ of platinum contained in the third supported catalyst in this case. In addition, the second supported catalyst 22 contains a spinel-type Al—Mg-based composite oxide exhibiting $NO_x$ storage ability as a carrier thereof.

Pt plays a role of promoting the oxidation of NO to $NO_2$ as described above. In addition, Pt contained in the second supported catalyst 22 also plays a role of enhancing the $NO_x$ storage ability of the second heat resistant carrier 220 as described above. When the Pt ratio ($Pt_2/Pt_A$) is in the above range, the balance between the $NO_2$ generation rate by the third supported catalyst 25 and the $NO_2$ storage rate by the second supported catalyst 22 is favorable and the $NO_x$ storage amount in the exhaust gas-purifying catalyst 1 can be maximized.

For this reason, the exhaust gas-purifying catalyst 1 can store a large amount of $NO_x$ when the exhaust gas in an oxidizing atmosphere is supplied by employing such a configuration. Hence, this exhaust gas-purifying catalyst 1 can store a large amount of $NO_x$ even when the temperature of the exhaust gas is relatively low and can decrease the amount of $NO_x$ emitted from the combustion engine to the outside.

In addition, in the lean-burn engine system, rich spike treatment is performed to purify NOx stored in the exhaust gas-purifying catalyst 1. The rich spike treatment is a treatment to decrease the air-fuel ratio of an air-fuel mixture to be supplied to the combustion chamber of the lean-burn engine to a value less than the stoichiometric air-fuel ratio. Specific examples of the rich spike treatment include a treatment to decrease the air-fuel ratio of the air-fuel mixture in the combustion chamber by supplying excess fuel to the combustion chamber through the control of operating conditions or engine.

By this rich spike treatment, reducing exhaust gas is supplied from the lean-burn engine to the exhaust gas-purifying catalyst 1. This reducing exhaust gas has relatively high concentrations of CO and HC and relatively low concentrations of $O_2$ and $NO_x$.

This reducing exhaust gas first diffuses into the second catalyst layer 20b. At least parts of CO and HC contained in the exhaust gas act as a reducing agent on the third supported catalyst 25 to reduce a nitrate of the second $NO_x$ storage material 26. By this reduction reaction, the $NO_x$ storage ability of the second $NO_x$ storage material 26 is recovered as well as $NO_x$ is released from the second $NO_x$ storage material 26. At least a part of $NO_x$ released from the second $NO_x$ storage material 26 is reduced to $N_2$ on the third noble metal 251 supported on the third supported catalyst 25 using CO and HC as a reducing agent.

In addition, at least parts of CO and HC contained in the exhaust gas diffused in the second catalyst layer 20b are respectively oxidized to $CO_2$ and $H_2O$ by the third noble metal 251 supported on the third supported catalyst 25, at least a part of $NO_x$ contained in the exhaust gas diffused in the second catalyst layer 20b is reduced to $N_2$ by the third noble metal 251 supported on the third supported catalyst 25, and $CO_2$, $H_2O$, and $N_2$ are discharged from the second catalyst layer 20b into the air.

Next, the exhaust gas having passed through the second catalyst layer 20b diffuses into the first catalyst layer 20a. The exhaust gas diffused in the second catalyst layer 20b has lower concentrations of CO and HC and a higher concentration of $NO_x$ than the exhaust gas before diffusing in the second catalyst layer 20b.

At least parts of CO and HC diffused into the first catalyst layer 20a act as a reducing agent on the noble metals supported on the first and second supported catalysts to reduce the nitrate of the first $NO_x$ storage material 24. By this reduction reaction, the $NO_x$ storage ability of the first $NO_x$ storage material 24 is recovered as well as $NO_x$ is released from the first $NO_x$ storage material 24. At least a part of $NO_x$ released from the first $NO_x$ storage material 24 is reduced to $N_2$ on the noble metals supported on the first and second supported catalysts using CO and HC as a reducing agent.

In addition, at least parts of CO and HC contained in the exhaust gas diffused into the first catalyst layer 20a are respectively oxidized to $CO_2$ and $H_2O$ by the noble metals supported on the first and second supported catalysts, at least a part of $NO_x$ contained in the exhaust gas diffused into the first catalyst layer 20a is reduced to $N_2$ by the noble metals supported on the first and second supported catalysts, and $CO_2$, $H_2O$, and $N_2$ are discharged from the first catalyst layer 20a into the air via the second catalyst layer 20b.

As described above, Rh supported on the first supported catalyst 21 exhibits high $NO_x$ purification performance. In addition, the first supported catalyst 21 and the second supported catalyst 22 are uniformly mixed together in the first catalyst layer 20a. Hence, there is a high possibility that at least a part of the first supported catalyst 21 and at least a part of the second supported catalyst 22 are adjacent to each other. For this reason, the first supported catalyst 21 can reduce at least a part of a large amount of $NO_x$ released from the second supported catalyst 22 in addition to $NO_x$ released from the first supported catalyst 21 itself.

By employing such a configuration, the exhaust gas-purifying catalyst 1 can reduce a large amount of $NO_x$ to $N_2$ when the exhaust gas in a reducing atmosphere is supplied. Hence, this exhaust gas-purifying catalyst can store a large amount of $NO_x$ even when the exhaust gas at a relatively low temperature is supplied and can realize high $NO_x$ purification performance.

This exhaust gas-purifying catalyst 1 contains three kinds of supported catalysts of the first supported catalyst 21 mainly supporting Rh, the second supported catalyst 22 mainly supporting Pt, and the third supported catalyst 25 mainly supporting Pt and a noble metal other than Pt. Moreover, the first and second supported catalysts are contained in the first catalyst layer 20a, and the third supported catalyst 25 is contained in the second catalyst layer 20b closer to the exhaust gas than the first catalyst layer 20a.

In this manner, the main role played by the first catalyst layer 20a can be made different from the main role played by the second catalyst layer 20b by setting the kinds of noble metals mainly supported on the three kinds of supported catalysts to be different from one another and disposing the first supported catalyst 21 and second supported catalyst 22 and the third supported catalyst 25 in different layers.

Moreover, the $NO_x$ storage ability of the exhaust gas-purifying catalyst 1 can be further enhanced by setting the main role played by the first catalyst layer 20a to storage and reduction of $NO_x$ and the main role played by the second catalyst layer 20b to oxidation of NO.

[Other Configurations]

The configuration of this exhaust gas-purifying catalyst 1 can be variously modified in addition to the configurations described above.

[Modification]

FIG. 3 is a cross-sectional view schematically illustrating a modification of the exhaust gas-purifying catalyst illustrated in FIGS. 1 and 2. This exhaust gas-purifying catalyst 1 is an exhaust gas-purifying catalyst 1 employing the same configuration as that of the exhaust gas-purifying catalyst 1 illustrated in FIGS. 1 and 2 except that the catalyst layer 20 has a single-layer structure.

In the case of employing such a configuration, it is possible to further increase the $NO_x$ storage amount when exhaust gas having a relatively high temperature is supplied as compared with the case of employing a structure having plural catalyst layers. In other words, in the case of employing such a configuration, the first supported catalyst 21, the second supported catalyst 22, and the third supported catalyst 25 are relatively uniformly mixed together in the catalyst layer 20. Moreover, the activity of each supported catalyst is sufficiently enhanced when the temperature of the exhaust gas to be supplied to the catalyst layer is sufficiently high. It is considered that a large amount of $NO_x$ can be stored in such a state since the third supported catalyst 25 of which the main role is to generate $NO_x$ and the second supported catalyst 22 of which the main role is to store $NO_x$ are uniformly mixed together in the same layer.

In addition, the exhaust gas-purifying catalyst 1 can be produced through a smaller number of steps as compared with the exhaust gas-purifying catalyst 1 having plural catalyst layers. In other words, this exhaust gas-purifying catalyst illustrated in FIG. 3 can be obtained by the production method described above except that the third supported catalyst 25 is added to the first slurry and the formation of the second catalyst layer using the second slurry is omitted.

[Exhaust Gas-Purifying System]

The exhaust gas-purifying system includes an internal combustion engine which emits exhaust gas and an exhaust gas-purifying catalyst 1 installed in an exhaust gas emitting channel.

As the internal combustion engine, a lean-burn engine, a gasoline engine, or a diesel engine can be used.

This exhaust gas-purifying system may further include a three-way catalyst, a diesel oxidation catalyst (DOC), a diesel particulate filter (DPF), a selective catalytic reduction (SCR) system and the like in addition to the internal combustion engine and the exhaust gas-purifying catalyst 1.

A three-way catalyst and DOC promote the oxidation of CO and HC in an oxidizing atmosphere and the reduction reaction of $NO_x$ in a reducing atmosphere.

It is preferable that at least one of the three-way catalyst and DOC is installed between the internal combustion engine and the exhaust gas-purifying catalyst 1. In the case of employing such a configuration, at least a part of NO contained in the exhaust gas emitted from the internal combustion engine is first oxidized to $NO_2$ by at least one of the three-way catalyst and DOC. Hence, in the case of employing such a configuration, the concentration of $NO_2$ contained in the exhaust gas to be supplied to the exhaust gas-purifying catalyst 1 is higher as compared with a case in which at least one of the three-way catalyst and DOC is not contained. For this reason, the exhaust gas-purifying catalyst 1 is more likely to store $NO_2$ and the amount of $NO_2$ emitted to the outside can be decreased.

DPF adsorbs particulate substances contained in the exhaust gas emitted from the internal combustion engine. DPF may be installed between the exhaust gas-purifying catalyst 1 and at least one of the three-way catalyst and DOC or downstream of the exhaust gas-purifying catalyst 1 along the flow of exhaust gas.

An SCR system purifies $NO_x$ using a reducing agent such as urea. The SCR system is preferably installed downstream of the exhaust gas-purifying catalyst 1 along the flow of exhaust gas. The amount of $NO_x$ emitted to the outside can be further decreased in the case of using such a configuration.

EXAMPLES

Hereinafter, Examples of the present invention will be described.

Example 1

[Preparation of First Supported Catalyst S1A]

A rhodium nitrate solution containing 0.1 g of Rh and 30 g of Al—Zr—Ce composite oxide AZC1 were mixed together and thoroughly stirred. The proportion of $Al_2O_3$ in Al—Zr—Ce composite oxide AZC1 was 55% by mass, the proportion of $CeO_2$ was 20% by mass, and the proportion of $ZrO_2$ was 25% by mass. In addition, the crystal structure of Al—Zr—Ce composite oxide AZC1 was a spinel type. Subsequently, this mixture was dried to obtain a powder. Subsequently, the powder obtained was fired in the air at a temperature of 500° C. for 1 hour. A first supported catalyst S1A was thus obtained.

[Preparation of Second Supported Catalyst S2A]

A platinum nitrate solution containing 0.46 g of Pt and 140 g of spinel-type Al—Mg composite oxide AM1 were mixed together and thoroughly stirred. The BET specific surface area of spinel-type Al—Mg composite oxide AM1 was 150 $m^2$/g. In addition, the proportion of $Al_2O_3$ in spinel-type Al—Mg composite oxide AM1 was 80% by mass and the proportion of $MgO_2$ was 20% by mass. Subsequently, this mixture was dried to obtain a powder. Subsequently, the powder obtained was fired in the air at a temperature of 500° C. for 1 hour. A second supported catalyst S2A was thus obtained.

[Preparation of Third Supported Catalyst S3A]

A Pt nitrate solution containing 1.46 g of Pt, a Pd nitrate solution containing 0.22 g of Pd, and 60 g of alumina AO1 were mixed together and thoroughly stirred. The crystal structure of alumina AO1 was γ type (spinel type). Subsequently, this mixture was dried to obtain a powder. Subsequently, the powder obtained was fired in the air at a temperature of 500° C. for 1 hour. A third supported catalyst S3A was thus obtained.

[Production of Catalyst A]

A first slurry was obtained by mixing the entire amount of the first supported catalyst S1A, the entire amount of the second supported catalyst S2A, 8.5 g of a binder, barium acetate, and 500 g of ion-exchanged water together. Subsequently, this first slurry was applied onto a monolith honeycomb carrier, dried at a temperature of 250° C. for 1 hour, and then fired at a temperature of 500° C. for 1 hour to obtain a first catalyst layer. The volume of the monolith honeycomb carrier was 1 liter. In addition, the amount of the first slurry coated per unit volume of the first catalyst layer was 220 g/L.

Next, a second slurry was obtained by mixing the entire amount of the third supported catalyst S3A, 3 g of a binder, barium acetate, and 200 g of ion-exchanged water together. Subsequently, this second slurry was applied onto the monolith honeycomb carrier provided with the first catalyst layer, dried at a temperature of 250° C. for 1 hour, and then fired at a temperature of 500° C. for 1 hour to obtain a second catalyst layer. The amount of the second slurry coated per unit volume of the second catalyst layer was 90 g/L.

An exhaust gas-purifying catalyst was thus obtained. Hereinafter, this exhaust gas-purifying catalyst is referred to as a catalyst A.

Example 2

[Preparation of Second Supported Catalyst S2B]

A second supported catalyst S2B was obtained by the same method as that described in the example 1 except that the amount of Pt contained in the platinum nitrate solution was changed from 0.46 g to 0.3 g.

[Preparation of Third Supported Catalyst S3B]

A third supported catalyst S3B was obtained by the same method as that described in the example 1 except that the amount of Pt contained in the platinum nitrate solution was changed from 1.46 g to 1.62 g.

[Production of Catalyst B]

An exhaust gas-purifying catalyst was obtained by the same method as that described in the example 1 except that the second supported catalyst S2B and the third supported catalyst S3B were used instead of the second supported catalyst S2A and the third supported catalyst S3A, respectively. Hereinafter, this exhaust gas-purifying catalyst is referred to as a catalyst B.

Example 3

[Preparation of Second Supported Catalyst S2C]

A second supported catalyst S2C was obtained by the same method as that described in the example 1 except that the amount of Pt contained in the platinum nitrate solution was changed from 0.46 g to 0.67 g.

[Preparation of Third Supported Catalyst S3C]

A third supported catalyst S3C was obtained by the same method as that described in the example 1 except that the amount of Pt contained in the platinum nitrate solution was changed from 1.46 g to 1.25 g.

[Production of Catalyst C]

An exhaust gas-purifying catalyst was obtained by the same method as that described in the example 1 except that the second supported catalyst S2C and the third supported catalyst S3C were used instead of the second supported catalyst S2A and the third supported catalyst S3A, respectively. Hereinafter, this exhaust gas-purifying catalyst is referred to as a catalyst C.

Example 4

[Preparation of Second Supported Catalyst S2D]

A second supported catalyst S2D was obtained by the same method as that described in the example 1 except that the amount of spinel-type Al—Mg complex oxide AM1 was changed from 140 g to 70g.

[Preparation of Third Supported Catalyst S3D]

A third supported catalyst S3D was obtained by the same method as that described in the example 1 except that the amount of alumina AO1 was changed from 60 g to 130 g.

[Production of Catalyst D]

An exhaust gas-purifying catalyst was obtained by the same method as that described in the example 1 except that the second supported catalyst S2D and the third supported catalyst S3D were used instead of the second supported catalyst S2A and the third supported catalyst S3A, respectively. Hereinafter, this exhaust gas-purifying catalyst is referred to as a catalyst D.

Example 5

[Preparation of Second Supported Catalyst S2E]

A second supported catalyst S2E was obtained by the same method as that described in the example 1 except that the amount of spinel-type Al—Mg complex oxide AM1 was changed from 140 g to 100 g.

[Preparation of Third Supported Catalyst S3E]

A third supported catalyst S3E was obtained by the same method as that described in the example 1 except that the amount of alumina AO1 was changed from 60 g to 110 g.

[Production of Catalyst E]

An exhaust gas-purifying catalyst was obtained by the same method as that described in the example 1 except that the second supported catalyst S2E and the third supported catalyst S3E were used instead of the second supported catalyst S2A and the third supported catalyst S3A, respectively. Hereinafter, this exhaust gas-purifying catalyst is referred to as a catalyst E.

Example 6

[Preparation of First Supported Catalyst S1F]

A first supported catalyst S1F was obtained by the same method as that described in the example 1 except that zirconia ZR1 was used instead of Al—Zr—Ce composite oxide AZC1. The crystal structure of zirconia ZR1 was a monoclinic type.

[Production of Catalyst F]

An exhaust gas-purifying catalyst was obtained by the same method as that described in the example 1 except that the first supported catalyst S1F was used instead of the first supported catalyst S1A. Hereinafter, this exhaust gas-purifying catalyst is referred to as a catalyst F.

Example 7

[Production of Catalyst G]

A slurry was obtained by mixing the entire amount of the first supported catalyst S1A, the entire amount of the second supported catalyst S2A, the entire amount of the third supported catalyst S3A, barium acetate containing barium at 2 mol, and 500 g of ion-exchanged water together. Subsequently, this slurry was applied onto a monolith honeycomb carrier, dried at a temperature of 250° C. for 1 hour, and then fired at a temperature of 500° C. for 1 hour to obtain an exhaust gas-purifying catalyst. Hereinafter, this exhaust gas-purifying catalyst is referred to as a catalyst G. The volume of the monolith honeycomb carrier was 1 liter. In addition, the amount of the slurry coated per unit volume of the first catalyst layer was 290 g/L.

Example 8

[Preparation of Second Supported Catalyst S2H]

A second supported catalyst S2H was obtained by the same method as that described in the example 1 except that platinum was omitted.

[Preparation of Third Supported Catalyst S3H]

A third supported catalyst S3H was obtained by the same method as that described in the example 1 except that the amount of Pt contained in the platinum nitrate solution was changed from 1.46 g to 1.92 g.

[Production of Catalyst H]

An exhaust gas-purifying catalyst was obtained by the same method as that described in the example 1 except that the second supported catalyst S2H and the third supported catalyst S3H were used instead of the second supported catalyst S2A and the third supported catalyst S3A, respectively. Hereinafter, this exhaust gas-purifying catalyst is referred to as a catalyst H.

Example 9

[Preparation of Second Supported Catalyst S2I]

A second supported catalyst S2I was obtained by the same method as that described in the example 1 except that the amount of Pt contained in the platinum nitrate solution was changed from 0.46 g to 0.19 g.

[Preparation of Third Supported Catalyst S3I]

A third supported catalyst S3I was obtained by the same method as that described in the example 1 except that the amount of Pt contained in the platinum nitrate solution was changed from 1.46 g to 1.73 g.

[Production of Catalyst I]

An exhaust gas-purifying catalyst was obtained by the same method as that described in the example 1 except that the second supported catalyst S2I and the third supported catalyst S3I were used instead of the second supported catalyst S2A and the third supported catalyst S3A, respectively. Hereinafter, this exhaust gas-purifying catalyst is referred to as a catalyst I.

Example 10

[Preparation of Second Supported Catalyst S2J]

A second supported catalyst S2B was obtained by the same method as that described in the example 1 except that the amount of Pt contained in the platinum nitrate solution was changed from 0.46 g to 0.77 g.

[Preparation of Third Supported Catalyst S3J]

A third supported catalyst S3J was obtained by the same method as that described in the example 1 except that the amount of Pt contained in the platinum nitrate solution was changed from 1.46 g to 1.15 g.

[Production of Catalyst J]

An exhaust gas-purifying catalyst was obtained by the same method as that described in the example 1 except that the second supported catalyst S2J and the third supported catalyst S3J were used instead of the second supported catalyst S2A and the third supported catalyst S3A, respectively. Hereinafter, this exhaust gas-purifying catalyst is referred to as a catalyst J.

Example 11

[Preparation of Second Supported Catalyst S2K]

A second supported catalyst S2K was obtained by the same method as that described in the example 1 except that the amount of Pt contained in the platinum nitrate solution was changed from 0.46 g to 0.96 g.

[Preparation of Third Supported Catalyst S3K]

A third supported catalyst S3K was obtained by the same method as that described in the example 1 except that the amount of Pt contained in the platinum nitrate solution was changed from 1.46 g to 0.96 g.

[Production of Catalyst K]

An exhaust gas-purifying catalyst was obtained by the same method as that described in the example 1 except that the second supported catalyst S2K and the third supported catalyst S3K were used instead of the second supported catalyst S2A and the third supported catalyst S3A, respectively. Hereinafter, this exhaust gas-purifying catalyst is referred to as a catalyst K.

Example 12

[Preparation of Second Supported Catalyst S2L]

A second supported catalyst S2L was obtained by the same method as that described in the example 1 except that alumina AO1 was used instead of spinel-type Al—Mg complex oxide AM1.

[Production of Catalyst L]

An exhaust gas-purifying catalyst was obtained by the same method as that described in the example 1 except that the second supported catalyst S2L was used instead of the second supported catalyst S2A. Hereinafter, this exhaust gas-purifying catalyst is referred to as a catalyst L.

Example 13

[Preparation of Second Supported Catalyst S2M]

A second supported catalyst S2M was obtained by the same method as that described in the example 1 except that spinel-type Al—Mg—Fe complex oxide AMF1 was used instead of spinel-type Al—Mg complex oxide AM1. The proportion of $Al_2O_3$ in spinel-type Al—Mg—Fe complex oxide AMF1 was 65% by mass, the proportion of $MgO_2$ was 15% by mass, and the proportion of $Fe_2O_3$ was 20% by mass.

[Production of Catalyst M]

An exhaust gas-purifying catalyst was obtained by the same method as that described in the example 1 except that the second supported catalyst S2M was used instead of the second supported catalyst S2A. Hereinafter, this exhaust gas-purifying catalyst is referred to as a catalyst M.

Example 14

[Preparation of Second Supported Catalyst S2N]

A second supported catalyst S2N was obtained by the same method as that described in the example 1 except that spinel-type Al—Mg—Ce—Ba complex oxide AMCB1 was used instead of spinel-type Al—Mg complex oxide AM1. The proportion of $Al_2O_3$ in spinel-type Al—Mg—Ce—Ba complex oxide AMCB1 was 60% by mass, the proportion of $MgO_2$ was 20% by mass, the proportion of $CeO_2$ was 7% by mass, and the proportion of $BaCO_3$ was 13% by mass.

[Production of Catalyst N]

An exhaust gas-purifying catalyst was obtained by the same method as that described in the example 1 except that the second supported catalyst S2N was used instead of the second supported catalyst S2A. Hereinafter, this exhaust gas-purifying catalyst is referred to as a catalyst N.

<Evaluation on $NO_x$ Storage Amount in Exhaust Gas-Purifying Catalyst>

The $NO_x$ storage amount in the catalysts A to N was evaluated.

Specifically, each of the catalysts A to N was first placed in an electric furnace and subjected to a heat treatment. The heat treatment temperature was set to 700° C., and the heat treatment time was set to 50 hours.

Figure 4:
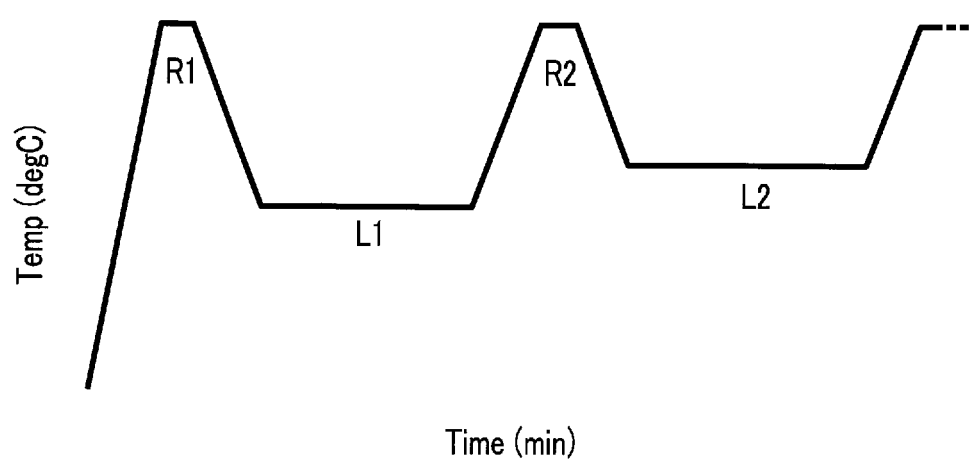
FIG. 4 is a graph illustrating the relation between time and temperature in the nitrogen oxide storage amount measurement test.

Subsequently, the catalyst after being subjected to the heat treatment was placed in a simulated gas generator. Subsequently, the $NO_x$ storage amount measurement test was performed under the conditions illustrated in FIG. 4. FIG. 4 is a graph illustrating the relation between time and temperature in the nitrogen oxide storage amount measurement test. In the graph of FIG. 4, the horizontal axis represents the time and the vertical axis represents the temperature. R1 and R2 in FIG. 4 represent the period for which the pretreatment operation is performed, and L1 and L2 represent the period for which the $NO_x$ storage amount measurement is performed.

minutes and $NO_x$ in the catalyst was purged. Subsequently, the gas to be supplied to the catalyst was switched from the rich gas to a lean gas at 300° C. and supplied for 30 minutes. Subsequently, the amount of NO stored in the catalyst while the $NO_x$ concentration in the gas discharged from the catalyst reached 150 ppm was calculated in this lean gas supply period and adopted as the $NO_x$ storage amount at a temperature of 300° C.

Subsequently, this pretreatment using a rich gas and the $NO_x$ storage amount measurement using a lean gas were repeated and the $NO_x$ storage amount at temperatures of 400° C. and 500° C. were measured.

This result is presented in Table 1.

TABLE 1

| | First supported catalyst | Second supported catalyst | | | Third supported catalyst | | | | Pt ratio | NOx storage | | | |
|---|---|---|---|---|---|---|---|---|---|---|---|---|---|
| | First heat | Second heat | | | Third heat | | | | $Pt_2/Pt_A$ | amount (mg/L) | | | |
| | resistant carrier | resistant carrier | Content (g/L) | $Pt_2$ (g/L) | resistant carrier | Content (g/L) | $Pt_3$ (g/L) | Catalyst layer | (% by mass) | 200° C. | 300° C. | 400° C. | 500° C. |
| Catalyst A | Al—Zr—Ce | Spinel-type Al—Mg | 140 | 0.46 | Alumina | 60 | 1.46 | First layer | 23.96 | 229 | 496 | 809 | 283 |
| Catalyst B | Al—Zr—Ce | Spinel-type Al—Mg | 140 | 0.3 | Alumina | 60 | 1.62 | First layer | 15.63 | 224 | 482 | 793 | 274 |
| Catalyst C | Al—Zr—Ce | Spinel-type Al—Mg | 140 | 0.67 | Alumina | 60 | 1.25 | First layer | 34.90 | 213 | 447 | 728 | 297 |
| Catalyst D | Al—Zr—Ce | Spinel-type Al—Mg | 70 | 0.46 | Alumina | 130 | 1.46 | First layer | 23.96 | 194 | 422 | 712 | 249 |
| Catalyst E | Al—Zr—Ce | Spinel-type Al—Mg | 100 | 0.46 | Alumina | 100 | 1.46 | First layer | 23.96 | 201 | 442 | 744 | 266 |
| Catalyst F | Zr | Spinel-type Al—Mg | 140 | 0.46 | Alumina | 60 | 1.46 | First layer | 23.96 | 251 | 516 | 801 | 274 |
| Catalyst G | Al—Zr—Ce | Spinel-type Al—Mg | 140 | 0.46 | Alumina | 60 | 1.46 | Single layer | 23.96 | 186 | 453 | 904 | 379 |
| Catalyst H | Al—Zr—Ce | Spinel-type Al—Mg | 140 | 0 | Alumina | 60 | 1.92 | First layer | 0.00 | 118 | 297 | 578 | 211 |
| Catalyst I | Al—Zr—Ce | Spinel-type Al—Mg | 140 | 0.19 | Alumina | 60 | 1.73 | First layer | 9.90 | 142 | 386 | 636 | 200 |
| Catalyst J | Al—Zr—Ce | Spinel-type Al—Mg | 140 | 0.77 | Alumina | 60 | 1.15 | First layer | 40.10 | 95 | 267 | 810 | 253 |
| Catalyst K | Al—Zr—Ce | Spinel-type Al—Mg | 140 | 0.96 | Alumina | 60 | 0.96 | First layer | 50.00 | 143 | 191 | 566 | 190 |
| Catalyst L | Al—Zr—Ce | Alumina | 140 | 0.46 | Alumina | 60 | 1.46 | First layer | 23.96 | 67 | 101 | 327 | 101 |
| Catalyst M | Al—Zr—Ce | Spinel-type Al—Mg—Fe | 140 | 0.46 | Alumina | 60 | 1.46 | First layer | 23.96 | 235 | 501 | 700 | 241 |
| Catalyst N | Al—Zr—Ce | Spinel-type Al—Mg—Ce—Ba | 140 | 0.46 | Alumina | 60 | 1.46 | First layer | 23.96 | 227 | 515 | 728 | 221 |

In this test, a rich gas was first supplied to the catalyst for 10 minutes as the pretreatment operation. The temperature of the rich gas was set to 500° C., and the space velocity SV (1/hr) was set to 40000. In addition, a gas obtained by mixing $N_2$ gas with 5% by volume of $CO_2$, 5% by volume of $H_2O$, 700 ppm of $C_3H_6$, and 1% by volume of CO was used as the rich gas.

Next, the gas to be supplied to the catalyst was switched from the rich gas to a lean gas at 200° C. and supplied for 30 minutes. The space velocity SV (1/hr) of the lean gas was set to 40000. In addition, a gas obtained by mixing $N_2$ gas with 500 ppm NO, 10% by volume of $O_2$, 5% by volume of $CO_2$, and 5% by volume of $H_2O$ was used as the lean gas.

Subsequently, the amount of NO stored in the catalyst while the NO concentration in the gas discharged from the catalyst reached 150 ppm was calculated and adopted as the $NO_x$ storage amount at a temperature of 200° C.

Subsequently, the gas to be supplied to the catalyst was switched from the lean gas to a rich gas and supplied for 10

In Table 1 above, the kind of the first heat resistant carrier is described in the row written as the "first heat resistant carrier" in the lower row under the heading "first supported catalyst".

In addition, the kind of the second heat resistant carrier is described in the row written as the "second heat resistant carrier" among the lower rows under the heading "second supported catalyst". The amount of the second heat resistant carrier per unit volume is described in the row written as the "content (g/L)". The amount of Pt contained in the second supported catalyst per unit volume is described in the row written as the "$Pt_2$ (g/L)".

In addition, in Table 1 above, the kind of the third heat resistant carrier is described in the row written as the "third heat resistant carrier" among the lower rows under the heading "third supported catalyst". The amount of the third heat resistant carrier per unit volume is described in the row written as the "content (g/L)". The amount of Pt contained in the third supported catalyst per unit volume is described in the row written as the "$Pt_3$ (g/L)". The catalyst layer containing the third supported catalyst is described in the row written as the "catalyst layer".

In addition, the proportion of the mass $Pt_2$ of platinum contained in the second supported catalyst in the entire mass $Pt_A$ of platinum contained in the exhaust gas-purifying catalyst 1 is described in the lower row under the heading "Pt ratio $Pt_2/Pt_A$ (% by mass)" in Table 1 above.

Furthermore, the $NO_x$ storage amounts at temperatures of 200° C. to 500° C. attained in the performance evaluation of the exhaust gas-purifying catalyst is described in the rows written as the "200° C", "300° C", "400° C." and "500° C." among the lower rows under the heading "$NO_x$ storage amount (mg/L)" in Table 1 above.

Figure 5:
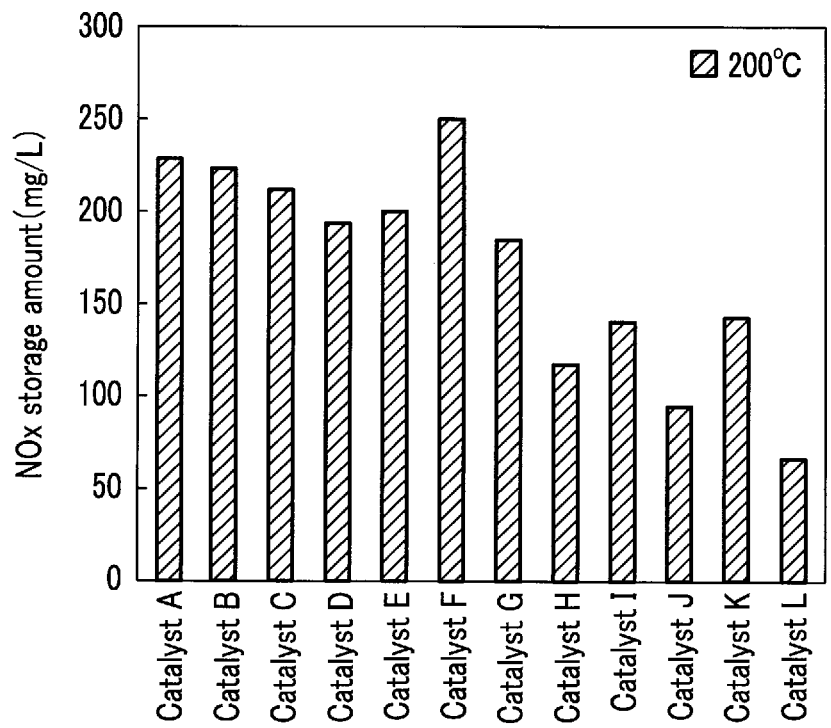
FIG. 5 is a graph illustrating the results of the nitrogen oxide storage amount evaluation test at a temperature of 200° C.
Figure 6:
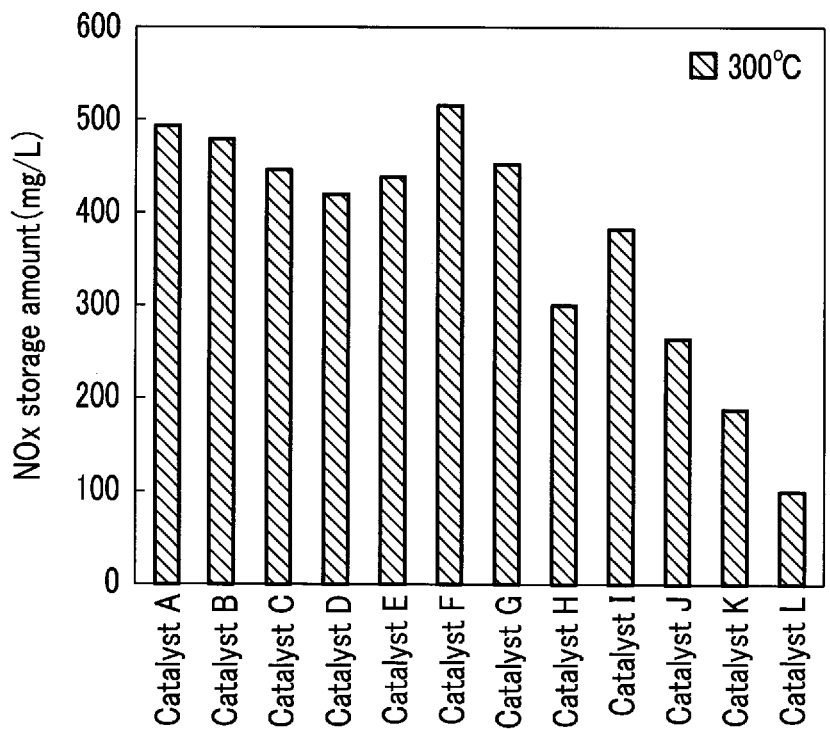
FIG. 6 is a graph illustrating the results of the nitrogen oxide storage amount evaluation test at a temperature of 300° C.

FIG. 5 is a graph illustrating the results of the nitrogen oxide storage amount evaluation test at a temperature of 200° C. FIG. 6 is a graph illustrating the results of the nitrogen oxide storage amount evaluation test at a temperature of 300° C. FIG. 7 is a graph illustrating the results of the nitrogen oxide storage amount evaluation test at a temperature of 400° C. FIG. 8 is a graph illustrating the results of the nitrogen oxide storage amount evaluation test at a temperature of 500° C. FIGS. 5 to 8 have been created using the data attained for the catalysts A to L. In the graphs illustrated in FIGS. 5 to 8, the vertical axis represents the $NO_x$ storage amount (mg/L) attained for each catalyst.

As illustrated in FIGS. 5 to 8, the $NO_x$ storage amounts in the catalysts A to G were greater than the $NO_x$ storage amounts in the catalysts H to L. This tendency was observed particularly when exhaust gas having a relatively low temperature of 200° C. to 300° C. was supplied. In addition, as apparent from Table 1 and FIGS. 5 to 8, the catalyst F in which the kind of the first heat resistant carrier is zirconia had particularly an excellent $NO_x$ storage amount at low temperatures. In addition, as apparent from Table 1 and FIGS. 5 to 8, the catalyst G having a single-layer structure had particularly an excellent $NO_x$ storage amount at high temperatures.

Figure 9:
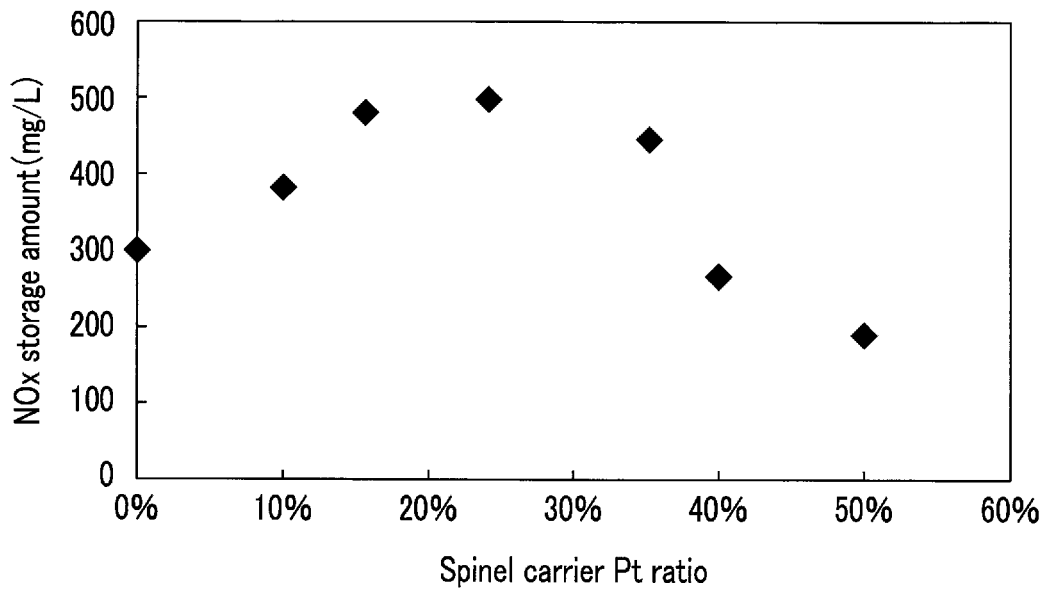
FIG. 9 is a graph illustrating an example of the relation between the spinel carrier platinum ratio and the nitrogen oxide storage amount.

FIG. 9 is a graph illustrating an example of the relation between the spinel carrier platinum ratio and the nitrogen oxide storage amount. FIG. 9 has been created utilizing the $NO_x$ storage amount evaluation results attained for the catalysts A to C and H to K at a temperature of 300° C. As apparent from Table 1 and FIG. 9, the $NO_x$ storage amounts in the catalysts A to C in which the spinel carrier Pt ratio, namely, the Pt ratio $Pt_2/Pt_A$ was in a range of 15% by mass to 35% by mass were greater as compared with those in the catalysts H and I in which the Pt ratio $Pt_2/Pt_A$ was lower than 15% by mass and the catalysts J and K in which the Pt ratio $Pt_2/Pt_A$ was higher than 35% by mass.

Figure 10:
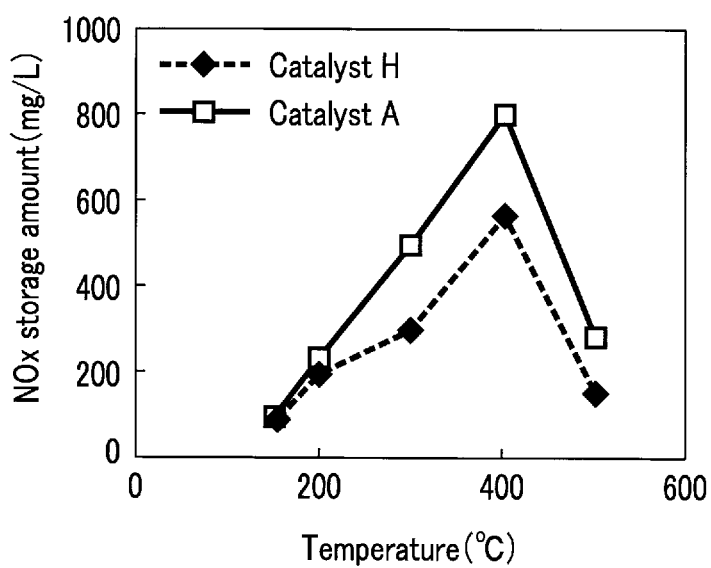
FIG. 10 is a graph illustrating an example of the relation between the temperature and the nitrogen oxide storage amount.

FIG. 10 is a graph illustrating an example of the relation between the temperature and the nitrogen oxide storage amount. FIG. 10 has been created utilizing the data attained for the catalysts A and H. As apparent from FIG. 10, the $NO_x$ storage amount in the catalyst A was greater than the $NO_x$ storage amount in the catalyst H at any exhaust gas temperature.

What is claimed is:

1. An exhaust gas-purifying catalyst comprising a substrate and a catalyst layer supported on the substrate, wherein the catalyst layer contains:
   a first supported catalyst containing a first heat resistant carrier and rhodium supported on the first heat resistant carrier;
   a second supported catalyst containing a second heat resistant carrier and platinum supported on the second heat resistant carrier, the second heat resistant carrier containing an inorganic oxide which has a spinel structure and contains alumina and magnesia;
   a third supported catalyst containing a third heat resistant carrier and platinum and a noble metal other than platinum which are supported on the third heat resistant carrier; and
   a nitrogen oxide storage material,
   wherein a proportion of a mass of platinum contained in the second supported catalyst in an entire mass of platinum contained in the catalyst layer is in a range of 15% by mass to 35% by mass.

2. The exhaust gas-purifying catalyst according to claim 1, wherein the catalyst layer includes a first catalyst layer supported on the substrate and a second catalyst layer supported on the first catalyst layer, wherein the first catalyst layer contains the first supported catalyst and the second supported catalyst and the second catalyst layer contains the third supported catalyst.

3. The exhaust gas-purifying catalyst according to claim 1, wherein the first and second supported catalysts are mixed together and at least a part of the nitrogen oxide storage material is supported on the first and second supported catalysts.

4. The exhaust gas-purifying catalyst according to claim 1, wherein the first supported catalyst, the second supported catalyst, the third supported catalyst, and the nitrogen oxide storage material are mixed together.

5. The exhaust gas-purifying catalyst according to claim 1, wherein the second heat resistant carrier exhibits higher nitrogen oxide adsorption ability than the first and third heat resistant carriers.

6. The exhaust gas-purifying catalyst according to claim 1, wherein a proportion of magnesia in the inorganic oxide which has the spinel structure and contains the alumina and magnesia is in a range of 5% by mass to 30% by mass.

7. The exhaust gas-purifying catalyst according to claim 1, wherein the first heat resistant carrier contains zirconia, ceria, alumina, or a composite oxide containing one or more of zirconia, ceria, or alumina and the third heat resistant carrier contains a composite oxide containing alumina.

8. The exhaust gas-purifying catalyst according to claim 1, wherein the noble metal other than platinum is palladium.

9. The exhaust gas-purifying catalyst according to claim 1, wherein the nitrogen oxide storage material contains a carbonate or oxide containing at least one element selected from the group consisting of barium, potassium, lithium, and cerium.

* * * * *